March 30, 1954
C. J. BEAUCHEMIN
2,673,974
SIGNAL SYSTEM FOR VEHICLES
Filed Oct. 10, 1951
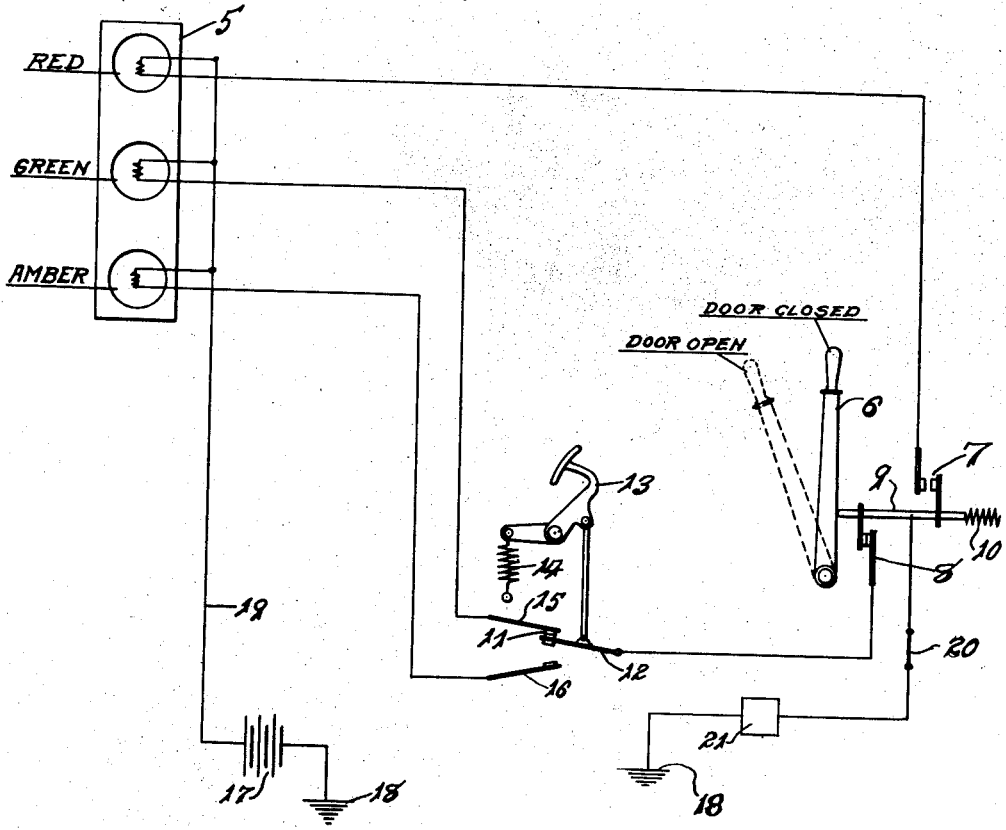
INVENTOR.
CLEMENT J. BEAUCHEMIN
BY
Louis V. Lucia
ATTORNEY.

Patented Mar. 30, 1954

2,673,974

UNITED STATES PATENT OFFICE 2,673,974

SIGNAL SYSTEM FOR VEHICLES

Clement J. Beauchemin, Farmington, Conn.

Application October 10, 1951, Serial No. 250,650

5 Claims. (Cl. 340—48)

This invention relates to a signal system for vehicles and more particularly to a system for passenger busses and the like.

It is an object of the invention to provide a system for passenger busses which will render signals that are visible upon the exterior of the bus to denote danger, safety and caution.

It is a further object of this invention to provide such a signal system which is automatically controlled through the operation of the bus.

A still further object is the provision of an electric signal system which is particularly adapted for passenger busses having doors and which will render a danger signal when the door is open.

Further objects and advantages of this invention will be more clearly understood from the following description and from the accompanying drawing in which:

The figure is a diagrammatic view illustrating my improved signal system.

As shown in the drawing, the numeral 5 indicates a signal box which is preferably mounted upon the rear of the bus and has a plurality of light signals for showing colors such as red, green and amber, to denote, respectively, danger, safety and caution.

The said signal system is controlled by a handle 6 which is conventionally used on the bus for opening and closing the door. This handle operates an electric switch 7, which controls the red signal light in the box 5, and a separate switch 8 which preferably controls the green and the amber lights of said signal box.

As shown in the drawing, both of said switches may be operated by a suitable element, such as an operating bar 9, which is moved by the handle against the tension of a return spring 10 to cause opening and closing of the switches 7 and 8.

The switch 8 is connected in series with a two-way switch 11 which has a bar 12 that is movable by the operation of the brake pedal 13 of the bus to control the energization of the green and amber lights. The said pedal being urged into normal position by a return spring 14.

The said two-way switch also includes a contact bar 15 that is connected to the green light and a separate contact bar 16 that is connected to the amber light.

The electric circuit shown in the drawings extends from one side of a battery, or other suitable source of electric energy, 17 which is grounded, as at 18, through a wire 19 to each of the three lights in the signal box 5. The said circuit then extends from the wire 19 to each of the three lights in the signal box 5. The said circuit then extends from the wire 19, through the red light, to the switch 7 and to the ground 18. The circuit also extends from the wire 19 through the green and amber lights to the contact bars 15 and 16 respectively.

If desired, a manually operable switch 20 may be employed in order that the electric circuit for the signal system may be open when the bus is not in use and the said switch may also be used to control the ignition system of the vehicle which is indicated generally at 21.

Assuming that the bus is under operation and that the manual switch 20 is closed, the operation of my improved signal is as follows:

When the bus is operating under normal conditions with the door closed and the brakes off, the switch 8 will be closed and the movable bar 12 will be in engagement with the contact bar 15 so that the green light will be on to thereby indicate safety.

Should the brake pedal 13 be pressed downwardly to apply the brakes while the door is still closed, the bar 12 will be shifted into contact with the bar 16 to thereby turn the green light off and the amber light on to indicate caution.

When the bus is stopped and the door is opened, the lever 6 will be moved to the position shown in dotted lines so that the switch 8 is forced to open position and the switch 7 to closed position by the spring 10. Closing of the said switch 7 will turn the red light on so that it will indicate danger.

It will be noted that the red light will always show when the door is open to thus indicate danger to the operators of following vehicles who might attempt to pass the bus. This is very important on passenger busses, and particularly on school busses, since it will warn the following operators that the door of the bus is open and that they must stop because persons may be getting off.

I claim:

1. For a vehicle having a door, an operating member for said door, and a foot operated member; an electric signal system including an electric circuit, a plurality of lights in said circuit, and means operated by said door operating member and foot operated member for controlling said circuit to separately energize said lights; the said circuit controlling means being adapted to cause energization of one of said lights when the door is closed and the foot operated member is in one position and to cause energization of still another of said lights when the door is closed and the foot operated member is in another position, and signal means responsive to the opening of the door only.

2. For a vehicle having a door, a member for operating said door to open and closed positions and a brake pedal; an electric signal system including an electric circuit, a plurality of different colored lights in said circuit, and electric switch means controlled by said operating member and brake pedal for controlling said circuit to separately energize said lights in accordance with the positions of said operating member and pedal; the said switch means being operable to cause energization of one of said lights when the door is opened, another of said lights when the door is closed and the brake pedal is in normal position, and still another of said lights when the door is closed and the brake pedal is in brake operating position.

3. For a vehicle having a door, a member for operating said door to open and closed positions, and a brake pedal; an electric signal system including a plurality of separate colored lights to denote danger, safety and caution, an electric circuit for separately energizing said lights, and electric switch means operated by said door operating member and brake pedal for controlling said circuit in accordance with the positions of said operating member and pedal; the said switch means including a switch adapted to close the circuit to energize the danger light when the door operating member is in open position, a separate switch adapted to be closed when the door is closed and the door operating member is in the respective position, and a two-way switch in series with said separate switch and rendered operable by movement of said pedal when the said separate switch is closed to cause energization of the safety light, when the pedal is in normal position, and of the caution light when the pedal is moved towards its brake applying position.

4. For a vehicle having a door, a member for operating said door to open and closed positions, and a brake pedal; an electric signal system including an electric circuit having three different colored lights to separately denote danger, safety and caution, and a plurality of switches in said circuit controlled by said door operating member and pedal for separately energizing the said lights; the said switches including first and second pairs of contacts controlled by the door operating member, the first pair of contacts being adapted to close and cause energization of the danger light when the door operating member is moved towards door opening position and to open and cause de-energization of the danger light when the said member is moved towards door closing position, the said second pair of contacts being adapted to close when the said member is moved to door closing position and to open when the operating member is moved towards door opening position, and a two-way switch in series with the said second pair of contacts for controlling the safety and caution lights, the said two-way switch being controlled by the brake pedal and rendered operable when the second pair of contacts are closed to cause energization of the safety light while the brake pedal is in normal position and of the caution light when the said brake pedal is moved towards brake applying position.

5. For a passenger bus having a passenger door, a manually operable member for operating said door to open and closed positions, and a brake pedal; an electric signal system including an electric circuit, a red, a green and an amber light in said circuit, switch means in said circuit controlled by said door operating member and including a pair of contacts adapted to close when the door is open and thereby cause energization of the red light, a separate pair of contacts controlled by said door operating member, and a two-way switch operated by the brake pedal and connected in series with said second pair of contact members to thereby render said two-way switch operable only when the door is in closed position; the said two-way switch being adapted to cause energization of the green light when the pedal is in normal position and of the amber light when the pedal is moved towards brake applying position.

CLEMENT J. BEAUCHEMIN.

References Cited in the file of this patent

UNITED STATES PATENTS

| Number | Name | Date |
|---|---|---|
| 1,169,138 | Downs et al. | Jan. 25, 1916 |
| 1,603,168 | Thieler | Oct. 12, 1926 |
| 2,349,740 | McCollum | May 23, 1944 |

FOREIGN PATENTS

| Number | Country | Date |
|---|---|---|
| 402 of 1931 | Australia | Dec. 17, 1931 |